United States Patent
Yurchick

(10) Patent No.: US 12,460,322 B2
(45) Date of Patent: Nov. 4, 2025

(54) METHODS FOR MANUFACTURING CARBON FIBER FROM COAL

(71) Applicant: CARBON HOLDINGS INTELLECTUAL PROPERTIES, LLC, Sheridan, WY (US)

(72) Inventor: Christopher L. Yurchick, McDonald, PA (US)

(73) Assignee: CARBON HOLDINGS INTELLECTUAL PROPERTIES, LLC, Ranchester, WY (US)

(*) Notice: Subject to any disclaimer, the term of this patent is extended or adjusted under 35 U.S.C. 154(b) by 1058 days.

(21) Appl. No.: 17/336,092

(22) Filed: Jun. 1, 2021

(65) Prior Publication Data

US 2021/0372010 A1    Dec. 2, 2021

Related U.S. Application Data

(60) Provisional application No. 63/031,725, filed on May 29, 2020.

(51) Int. Cl.
*D01F 9/15* (2006.01)
*B01D 53/32* (2006.01)
(Continued)

(52) U.S. Cl.
CPC .............. *D01F 9/15* (2013.01); *C08K 3/042* (2017.05); *C08L 101/12* (2013.01); *D01D 5/0985* (2013.01); *D01D 5/24* (2013.01); *D01F 1/10* (2013.01); *B01D 53/32* (2013.01); *C08L 2203/16* (2013.01)

(58) Field of Classification Search
CPC ... D01F 9/15; D01F 1/10; C08K 3/042; C08L 101/12; C08L 2203/16; D01D 5/0985; D01D 5/24; D01D 5/247; B01D 53/32; Y02C 20/40
See application file for complete search history.

(56) References Cited

U.S. PATENT DOCUMENTS

| | | | |
|---|---|---|---|
| 3,595,946 A | 7/1971 | Joo et al. | |
| 4,902,492 A * | 2/1990 | Beneke | D01F 9/15 423/447.6 |

(Continued)

FOREIGN PATENT DOCUMENTS

| | | |
|---|---|---|
| JP | S62170528 A | 7/1987 |
| JP | 2006307358 A | 11/2006 |

(Continued)

OTHER PUBLICATIONS

Yue, et al., Meltblown Solvated Mesophase Pitch-Based Carbon Fibers: Fiber Evolution and Characteristics, Journal of Carbon Research 2017; 3: 26, pp. 1-14 (Year: 2017).*

(Continued)

*Primary Examiner* — Daniel C. McCracken
(74) *Attorney, Agent, or Firm* — Dorsey & Whitney LLP

(57) ABSTRACT

Embodiments discloses herein relate to methods of processing coal. A method to process coal includes subjecting raw coal to a liquefaction process effective to form a pitch resin, subjecting the pitch resin to a variable crystallinity spinning process effective to form raw fiber, and subjecting the raw fiber to a carbonization process effective to form a low thermal conductivity carbon fiber.

12 Claims, 5 Drawing Sheets

(51) Int. Cl.
    *C08K 3/04*     (2006.01)
    *C08L 101/12*   (2006.01)
    *D01D 5/098*    (2006.01)
    *D01D 5/24*     (2006.01)
    *D01F 1/10*     (2006.01)

(56) References Cited

U.S. PATENT DOCUMENTS

| | | | | |
|---|---|---|---|---|
| 5,340,511 | A * | 8/1994 | Morgan | C01B 32/921 |
| | | | | 264/211 |
| 5,538,621 | A | 7/1996 | Kalback et al. | |
| 5,795,843 | A | 8/1998 | Endo | |
| 8,206,640 | B2 * | 6/2012 | Vakili | D04H 3/03 |
| | | | | 264/210.8 |
| 2003/0138370 | A1 | 7/2003 | Adams et al. | |
| 2010/0254887 | A1 * | 10/2010 | Leon y Leon | D01F 9/22 |
| | | | | 423/447.2 |
| 2015/0284880 | A1 * | 10/2015 | Alnasleh | D01F 9/17 |
| | | | | 264/211 |
| 2016/0272499 | A1 | 9/2016 | Zurutuza Elorza et al. | |
| 2016/0348283 | A1 | 12/2016 | Jo et al. | |
| 2019/0194544 | A1 | 6/2019 | Atkins et al. | |
| 2019/0194828 | A1 * | 6/2019 | Atkins | C08F 10/06 |
| 2020/0167647 | A1 | 5/2020 | De Waele et al. | |
| 2020/0299586 | A1 | 9/2020 | Atkins et al. | |
| 2020/0299589 | A1 | 9/2020 | Atkins et al. | |

FOREIGN PATENT DOCUMENTS

| | | |
|---|---|---|
| KR | 20170131693 A | 11/2017 |
| WO | 2019126782 A1 | 6/2019 |
| WO | 2020045243 A1 | 3/2020 |
| WO | 2021253010 A1 | 12/2021 |

OTHER PUBLICATIONS

Mochida, et al., Modification of mesophase pitch by blending Part 2 Modification of mesophase pitch fibre precursor with thermoresisting polyphenyleneoxide (PPO), Journal of Materials Science 1988; 23: 678-686 (Year: 1988).*

Ardary, et al., Carbon-Fiber Thermal Insulation, Union Carbide Corporation Nuclear Division Oak Ridge Y-12 Plant publication Y-1803, pp. 1-43 (Mar. 9, 1972) (Year: 1972).*

Mochida, et al., Blending mesophase pitch to improve its properties as a precursor for carbon fibre Part 1 Blending of PVC pitch into coal tar and petroleum-derived mesophase pitches, Journal of Materials Science 1988; 23: 670-677 (Year: 1988).*

Yue, et al., Activated carbon fibers from meltblown isotropic pitch fiber webs for vapor phase adsorption of volatile organic compounds, Chemical Engineering Journal 2017; 330: 183-190 (Year: 2017).*

International Search Report and Written Opinion dated Oct. 14, 2021 as received in PCT International Application No. PCT/US2021/035286.

Li, Xiao , et al., "Coal Liquefaction Residues Based Carbon Nanofibers Film Prepared by Electrospinning: An Effective Approach to Coal Waste Management", ACS Sustainable Chem. Eng., Feb. 25, 2019, 5742-5750.

Yue, Zhongren , et al., "Meltblown Solvated Mesophase Pitch-Based Carbon Fibers: Fiber Evolution and Characteristics", Journal of Carbon Research, vol. 3 issue 3 (Aug. 8, 2017): pp. 1-14, entire document, but especially: abstract, p. 10 para 2-3, p. 11 para 2.

Yue, Zhongren , et al., "Solvated rnesophase pitch-based carbon fibers: thermal oxidative stabilization of the spun fiber", Journal of Material Science, vol. 52 (Mar. 27, 2017): pp. 8176?8187, entire document.

International Search Report and Written Opinion dated Jan. 13, 2022 as received in PCT International Application No. PCT/US2021/041492.

Baily. How Can we Trust AI If We Don't Know How It Works. https://www.scientificamerican.com/article/how-can-we-trust-ai-if-we-dont-know-how-it-works/ (Oct. 3, 2023).

EP21814134.9 Partial Supplementary European Search Report dated Jun. 13, 2024 (13 pages).

EP21842332.5 Partial Supplementary European Search Report dated Jun. 13, 2024 (13 pages).

Lee et al. Effect of Process Condition on Tensile Properties of Carbon Fiber. Carbon Letters 2011: 12(1):26-30.

Owen. Assisted Development of Mesophase Pitch with Dispersed Graphene and its Resulting Carbon Fibers. Theses and Dissertations—Mechanical Engineering. 126. Accessed online at: https://uknowledge.uky.edu/me_etds/126.

Suthaharan. Machine Learning Models and Algorithms for Big Data Classification. Integrated Series in Information Systems 2016, 36: 1-359.

EP21814134.9 Extended European Search Report dated Oct. 2, 2024. 11 pages.

EP21842332.5 Extended European Search Report dated Sep. 3, 2024. 11 pages.

Zhu et al. Graphene and Graphene Oxide: Synthesis, Properties, and Applications. Advanced Materials 2010; 22:3906-3924.

* cited by examiner

METHODS FOR MANUFACTURING CARBON FIBER FROM COAL

CROSS REFERENCE TO RELATED APPLICATION

This application is a non-provisional patent application of, and claims priority to, U.S. Provisional Patent Application No. 63/031,725, filed 29 May 2020, entitled "METHODS FOR MANUFACTURING CARBON FIBER FROM COAL," the disclosure of which is hereby incorporated by reference in its entirety.

FIELD

The described embodiments relate generally to carbon products and carbon based processing methods. More particularly, the present embodiments relate to low-density carbon fiber and systems and methods for manufacturing the same from coal.

BACKGROUND

Fiber materials are used for many different applications in a wide variety of industries, such as the commercial aviation, recreation, industrial and transportation industries. Carbon fiber is used in a variety of composite materials, by virtue of its excellent properties such as high strength, high elastic modulus and high electrical conductivity.

Carbon fibers produced using previously known methods such as conventional carbon fiber (e.g., polyacrylonitrile (PAN)-based carbon fiber, pitch-based carbon fiber or cellulose-based carbon fiber), which can be produced through carbonization of organic fiber through thermal treatment exhibits low electrical conductivity and may be costly to develop. As such, manufacturers and users of carbon fibers continue to seek new and improved methods of forming carbon fibers. Many systems and methods described herein can use a low-cost and high-yielding coal-based pitch precursor that is advantageous from conventional high-cost and low-yielding PAN-based or cellulosic-based insulative fiber. The systems and methods described herein also can provide carbon fiber products in a manner that allows low cost pitch-based carbon fiber to fulfill all useful applications in a way that significantly reduces costs versus incumbents. For example, the systems and methods can produce affordable carbon fiber insulation for improving energy efficiency in a building environment as an alternative to fiber glass insulation.

SUMMARY

Embodiments discloses herein relate to methods for manufacturing low-density carbon fiber from coal. Embodiments herein also relate to a direct air capture system including a coal-derived electroactive polymer and a method of capturing carbon dioxide ($CO_2$) from a gaseous stream. The methods disclosed herein may include a continuous process. In an example, the methods disclosed herein can include the direct air capture system including a coal-derived electroactive polymer to capture CO2 from a gaseous stream.

In some embodiments, a method of processing coal may include subjecting raw coal to a liquefaction process effective to form a pitch resin, subjecting the pitch resin to a variable crystallinity spinning process effective to form raw fiber, subjecting the raw fiber to an oxygen stabilization process, and subjecting the stabilized fiber to a carbonization process effective to form a low thermal conductivity carbon fiber. In some embodiments, the method of processing coal may further include adding a blend additive to the pitch resin before or during the variable crystallinity spinning process. The blend additive can includes one or more of an isotropic pitch, an anistroptric pitch of varying degrees, or a thermoplastic blend additive. In some embodiments, the thermoplastic blend additive includes at least one of phenolic resins or lignin. In some embodiments, the variable crystallinity spinning process includes a melt blown solvated-spinning system.

In some embodiments, the method of processing coal may include foaming the raw fiber effective to introduce voids in the carbon fiber. In an embodiment, the method can include adding an oxygen-containing additive to the pitch resin before or during the variable crystallinity spinning process. The oxygen-containing additive can include an oxygen containing polymeric material. In some embodiments, the method of processing coal can include adding one or more compounds comprising heteroatoms to the pitch resin before or during the variable crystallinity spinning process. The one or more compounds comprising heteroatoms includes oxygen or nitrogen. The method of processing coal can also include processing the low thermal conductivity carbon fiber to produce a carbon fiber insulation, in some embodiments. In some embodiments, the low thermal conductivity carbon fiber can include a rate of heat transfer determined by a temperature and resonance time of the oxygen stabilization process. In some embodiments, subjecting the raw fiber to an oxygen stabilization process includes introducing a gas or a vapor during the oxygen stabilization process to determine a rate of heat transfer in the low thermal conductivity carbon fiber.

In an embodiment, a direct air capture system is disclosed. The direct air capture system can include a voltage source and a coal-derived electroactive polymer in electrical communication with the voltage source. The direct air capture system can be configured to bind carbon dioxide to the coal-derived electroactive polymer when a voltage is applied to the coal-derived electroactive polymer. In some embodiments, the coal-derived electroactive polymer includes a low thermal conductivity carbon fiber. The coal-derived electroactive polymer can include at least one of a graphene, graphene oxide, graphene nanotubes, or graphene dots. In some embodiments, the direct air capture system can include graphene nanotubes configured to provide an additional void space to promote greater insulating properties. In some embodiments, the coal-derived electroactive polymer is derived from a coal by a predetermined process. The predetermined process may include subjecting raw coal to a liquefaction process effective to form anthracene, oxidizing the anthracene to form anthraquinone, chlorinating the anthraquinone to form dichloroanthraquinone, and polymerizing the dichloroanthraquinone to produce the coal-derived electroactive polymer. In some embodiments, the anthraquinone can be chlorinated with hydrochloric acid.

In some embodiments, a method of capturing carbon dioxide is disclosed. The method of capturing carbon dioxide can include placing an electroactive polymer into a gaseous stream, applying a voltage to the electroactive polymer such that the carbon dioxide binds to the electroactive polymer, and reversing the polarity of the voltage applied to the electroactive polymer to release the carbon dioxide. The gaseous stream can include an amount of carbon dioxide. In some embodiments, the electroactive polymer may include at least one of a carbon nanotube, a graphene, a graphene oxide, graphene dots, or a combination thereof. The electroactive polymer can be configured to increase conductivity of the electroactive polymer. In some embodiments, the method of capturing carbon dioxide can further include collecting the carbon dioxide and converting the carbon dioxide into at least one of a syngas, a hydrocarbon material, or a densified liquid.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the present disclosure, wherein identical reference numerals refer to identical or similar elements or features in different views or embodiments shown in the drawings.

DETAILED DESCRIPTION

The present description provides examples, and is not limiting of the scope, applicability, or configuration set forth in the claims. Thus, it will be understood that changes can be made in the function and arrangement of elements discussed without departing from the spirit and scope of the disclosure, and various embodiments can omit, substitute, or add other procedures or components as appropriate. For instance, methods described can be performed in an order different from that described, and various steps can be added, omitted, or combined. Also, features described with respect to some embodiments can be combined in other embodiments.

Systems and methods for processing of pitches made from coal are provided, as well as products formed or manufactured by the systems and methods. Systems and methods described herein promote the production of low-cost low thermal conductivity carbon fiber products. For example, many carbon fiber products produced according to this disclosure have lower density than conventional carbon fiber products produced from similar materials. The low-density carbon fiber product retains heat and reduces heat transfer, thus providing the carbon fiber product with properties to lower the thermal conductivity relative to traditional carbon fibers. The low-thermal conductivity carbon fiber products produced according to many of the systems and methods described herein are unexpected to those skilled in the technology. Many embodiments of the systems and methods described herein enhance the conversion of coal-based pitch intermediate products into useful conversion products, such as high-carbon containing pitch fiber products with low-thermal conductivities. These products can be suitable as thermal insulation materials and/or low-density carbon fibers. In particular, the present techniques utilize specially designed systems and one or more blend additives for tuning physical properties of the carbon fibers, such as at least one of the density (specific gravity) and/or the thermal conductivity of the carbonized fiber.

Figure 1:
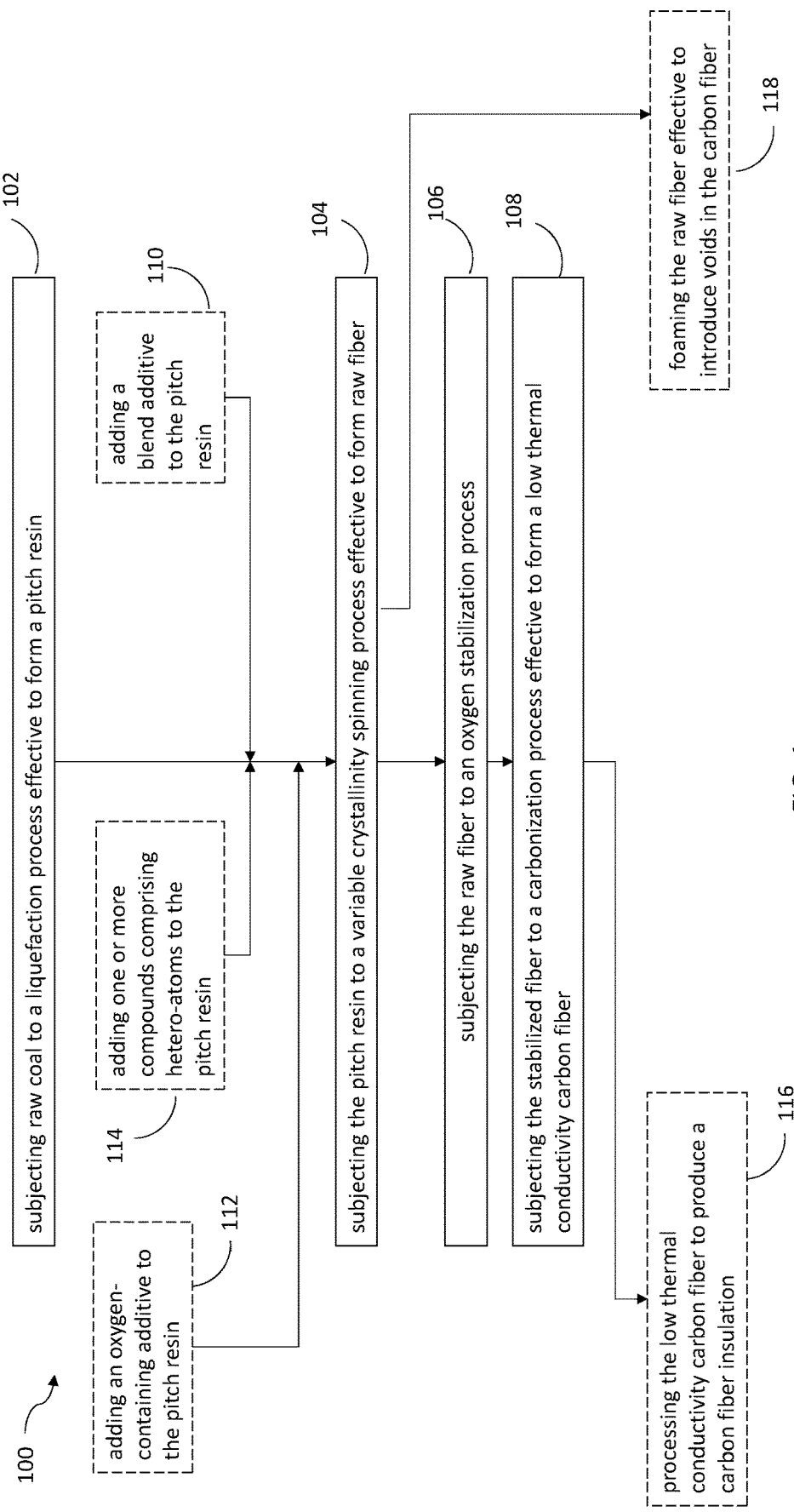
FIG. 1 is a flow chart of a method to form low density carbon fiber, according to an embodiment.

FIG. 1 is a flow diagram of a method 100 for manufacturing low thermal conductivity carbon fiber insulation, according to an embodiment. For example, the method 100 may include an act 102 of subjecting a raw coal to a liquefaction process effective to form a pitch resin. Coal liquefaction is a process in which coal is converted into liquid. There are several processes used to accomplish this task, the two most common being the indirect route and the direct route. In some embodiments, the indirect route is composed of 2 steps: First, the coal can be gasified with steam and oxygen to produce a synthesis gas (syngas), which is then cleaned to rid of dust, tar, and acid gases. The second step reacts the synthesis gas with a catalyst in the Fischer-Tropsch process, which converts the syngas into a range of hydrocarbons. For example, the hydrocarbon may include a pitch resin. In the direct route, coal is pulverized and reacted with a catalyst, then hydrogen is added under high pressures and temperatures in the presence of a solvent to produce hydrocarbons such as pitch resin.

In an embodiment, the pitch resin may then be subjected to a variable crystallinity spinning process effective to form a raw fiber in act 104. In many embodiments, the systems and methods include at least one of two processes for disrupting the highly-densified crystalline graphitic structure associated with carbon fibers. The two processes for disrupting the highly-densified crystalline graphitic structure can include physically altering spinning conditions in a variable-crystallinity spinning process and chemically altering pitch composition with one or more blend additives. Spinning conditions can be physically altered in a low crystallinity spinning process to be more conducive to disrupting liquid crystalline formation. In some embodiments, the spinning conditions can be physically altered by one or more of a turbulent flow spinneret design, low draw ratios on the green spun fiber, a melt blown solvated spinning system versus neat resin melt spinning, use of flow inverters or fritted flow redistributors in spinneret capillary channel, introduction of voids (such as nano-sized bubbles) in the spun fiber via foaming, and/or use of specialized spinnerets for formation of hollow fibers with one or more cross-sectional holes, or combinations thereof.

In some embodiments, the variable crystallinity spinning process can include a melt blown solvated spinning system.

The method 100 may also include an act 106. Act 106 includes subjecting the raw fiber to an oxygen stabilization process. In some embodiments, the raw fiber can undergo a stabilization process where air (oxygen), and in some cases additional gases or vapors, are introduced to alter the linear atomic bonding of the fibers to a more thermally stable form. Raw carbon fibers must be stabilized prior to a calcination step of the overall process discussed below in act 108. The stabilization prevents the molecules within the carbon fiber from exhibiting relaxation and becoming unaligned during the calcination step. The stabilization maintains the integrity of the molecules and allows the fibers to remain in their solid form throughout the final processing steps.

In some embodiments, the stabilization of the fibers can be performed at a temperature of 200-300° C. and include a resonance time of 30-120 minutes. During this resonance time, the fiber can be exposed to an atmosphere of air, which contains roughly 21% oxygen. Additional gases or vapors can be added the stabilization atmosphere to alter the reactions occurring within the pitch of the fibers. During act 106 including the stabilization, the fibers can be maintain under tension to prevent the relaxation and misalignment of the molecules with the pitch. Pitch-based carbon fibers may typically form esters and anhydride compounds within the pitch during act 106. The pitch-based fibers can also experience the loss of aromatic content during act 106.

The method 100 may also include an act 108. In act 108, the stabilized fiber can then be subjected to a carbonization process effective to form a low thermal conductivity carbon fiber. In some embodiments, carbonization is a process by which the stabilized fiber is heated and any volatile products (liquid and gaseous) can be driven off, leaving a solid low thermal conductivity carbon fiber.

In some embodiments, as shown in act 110, one or more blend additives may added to the pitch resin before or during the variable crystallinity spinning process. The pitch composition also can be chemically altered with one or more blend additives to be more conducive to disrupting liquid crystalline formation. The result of including one or more blend additives can be a carbon fiber that has a lower density than conventionally formed carbon fibers. The resulting carbon fiber, then, can include properties more similar or even superior to the properties of Rayon carbon fiber, such as a lower thermal conductivity. In some embodiments, the pitch composition can be altered by utilizing isotropic pitch and/or an anisotropic pitch with a degree of anisotropy between 0% and 80% as a blend additive (or neat) instead of high discotic liquid-crystalline containing mesophase pitches. In some embodiments, the blend additive can include one or more of an anisotropic pitch of varying degrees. Pitch may be made anisotropic through the use of one or more heat treatments.

In some embodiments, as shown in act 112, the pitch composition can be altered by utilizing oxygen containing additives such as an oxygen containing polymeric material. The oxygen-containing additive can be added to the pitch resin before or during the variable crystallinity spinning process. In some embodiments, as shown in act 114, the pitch composition can be altered by utilizing one or more compounds containing hetero-atoms such as oxygen or nitrogen. The one or more compounds including hetero-atoms can be added to the pitch resin before or during the variable crystallinity spinning process In some embodiments, the pitch composition can be altered by utilizing one or more thermoplastic blend additives (e.g. phenolic resins, lignin, etc.), which may include hetero-atoms such as oxygen or nitrogen. Blending materials including hetero-atoms (such as oxygen) with the pitch while spinning fibers can lower the density of the fibers. Examples of the one or more thermoplastic blend additives containing hetero-atoms such as nitrogen or oxygen can include (but is not limited to) polyphenolic formaldehyde resin, lignin, polyethylene oxide, poly vinyl alcohol, poly-DL-lactide, polymethylmethacrylate, or combinations thereof. In some embodiments, one or more of the hetero-atom containing additives can be derived from coal. Below is shown some examples of blend additives that can be added to the pitch resin to affect the crystallinity of the fiber.

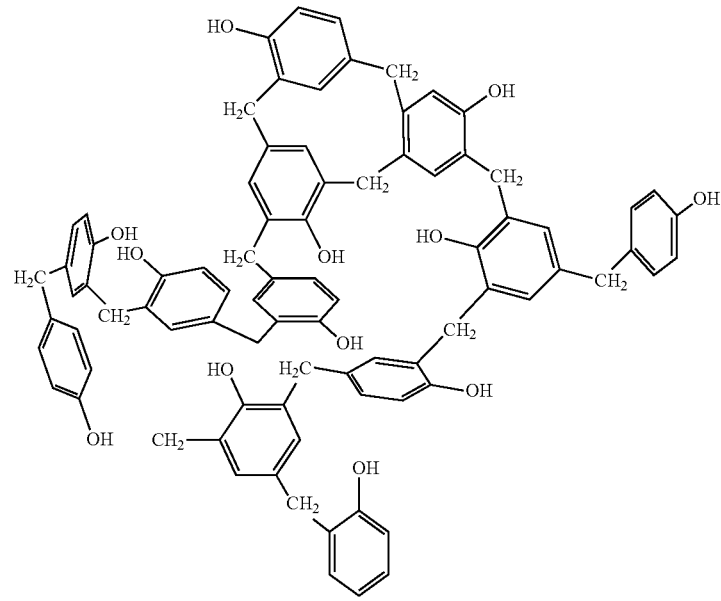

Polyphenolic formaldegyde resin

-continued

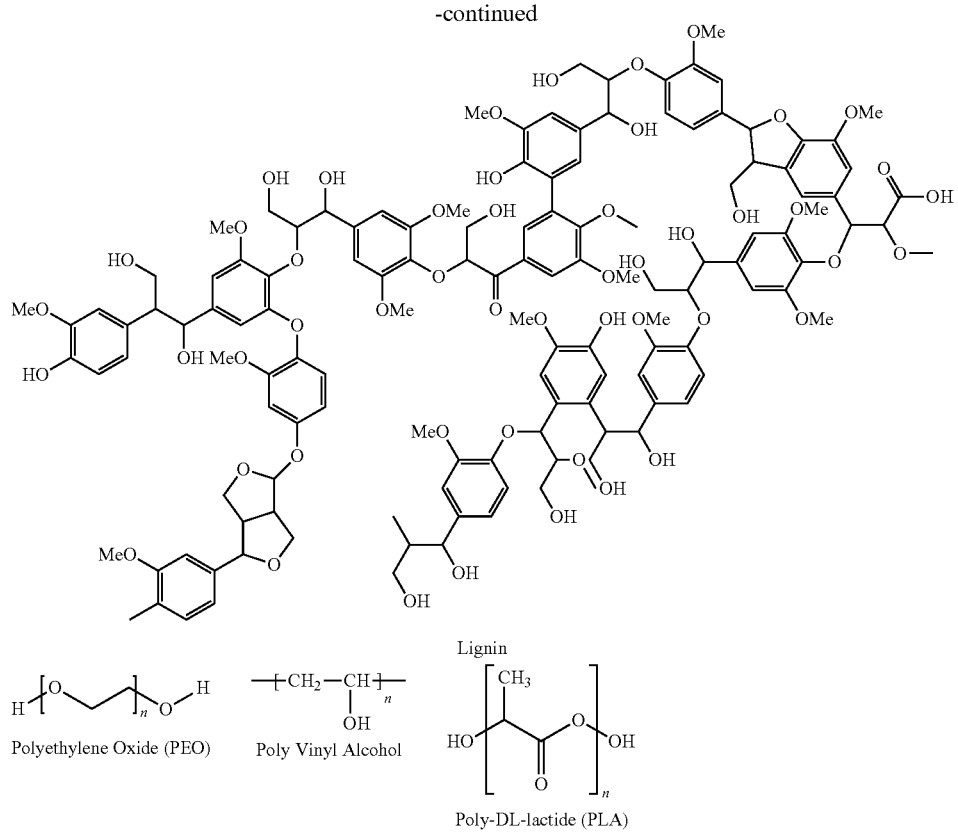

The physical and chemical processes for disrupting the highly-densified crystalline graphitic structure associated with carbon graphite fibers described above can alter the pitch-based carbon fibers to approach microstructure properties and resulting densities and insulative properties that are more commonly associated with cellulosic-based (Rayon) carbon fibers. Tables 1 and 2 below provide a comparison of properties of PAN-based, PITCH-based, and Rayon-based carbon fibers.

TABLE 1

Carbon Fiber Mechanical Properties
Carbon Fiber Mechanical Properties

|  | PAN Based | PITCH Based | Rayon Based |
| --- | --- | --- | --- |
| Tensile Modulus (Mpsi) | 33-56 | 23-55 | 5.9 |
| Tensile Strength (Msi) | 0.48-0.35 | 0.2-0.25 | 0.15 |
| Elongation (%) | 1.4-0.6 | 0.9-0.4 | 25 |
| Density (g/cc) | 1.8-1.9 | 1.9-2.0 | 1.6 |
| Carbon Assay (%) | 92-100 | 97-99 | 99 |

TABLE 2

Rayon Carbon Fiber Properties

| Parameter | Characterization |
| --- | --- |
| Tensile strength | ~100 ksi; 685 MPa |
| Tensile modulus | ~6 Msi; 41 GPa |
| Thermal conductivity | 3.7 W/m-K |
| Ash content | 0.4 w % |
| Carbon Assay, w % | 96+ |

In some embodiments, the method 100 may also include an act 116. In act 116, the low thermal conductivity carbon fiber can be processed to produce a carbon fiber insulation. The carbon fiber insulation may include several embodiments such as panels, boards, rolls, foams, felts, etc. In some embodiments, the method 100 may also include an act 118. Act 118 can include foaming the raw fiber, effective to introduce voids in the carbon fiber. In some embodiments, the foaming can make the carbon fiber less dense and improve thermal insulation properties.

The low-density carbon fibers formed according to one or more of the methods and systems described herein may be utilized in a direct air capture (DAC) system, such as a thermoelectric DAC or DAC using coal-derived electroactive polymers (EAPs).

Figure 2:
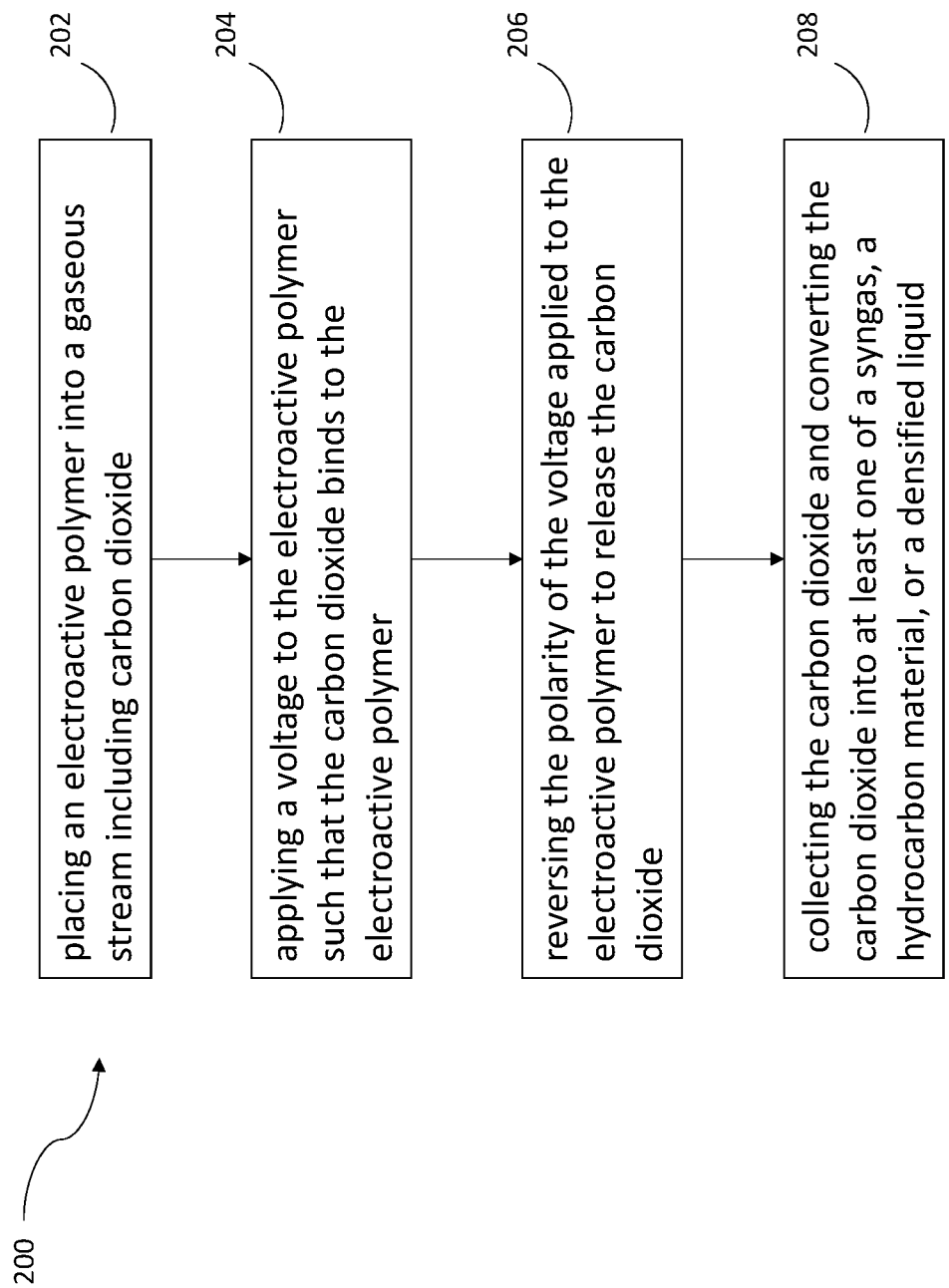
FIG. 2 is a flow chart of a method of capturing carbon dioxide, according to an embodiment.

FIG. 2 is a flow chart of a method 200 of capturing carbon dioxide ($CO_2$), according to an embodiment. In some embodiments, the method 200 can include an act 202 of placing an electroactive polymer into a gaseous stream. The gaseous stream can include carbon dioxide. In some embodiments, the gaseous stream may include a feed gas or exhaust gas stream. The method 200 can further include an act 204 of applying a voltage to the electroactive polymer such that the carbon dioxide binds to the electroactive polymer.

In some embodiments, the coal-derived EAP can retain ketone functionality, which promotes carbon dioxide binding to the EAP when a voltage is applied thereto. In act 206 of method 200, once the EAP binding sites are saturated with bound or adsorbed carbon dioxide, the polarity of the voltage can be reversed, resulting in bound carbon dioxide de-binding or being emitted from the EAP high quantities. As the polarity can be reversed in a battery or other system comprising the EAPs, separate materials are not needed for the anode and the cathode in the system. These properties allow use of feed gases having relatively low concentrations of carbon dioxide (415 ppm in air, for example), with the ability to pass the increase the amount of bound carbon dioxide with multiple passes of the feed gas over the EAP. In some embodiments, carbon nanotubes, graphene, graphene oxide, graphene dots, or a combination thereof and/or other coal-derived conductive carbon materials also may be added to the system to increase conductivity of the components including the EAPs. The method 200 can further include act 208. In act 208 the carbon dioxide can be collected and converted into at least one of a syngas, a hydrocarbon material, or a densified liquid.

Figure 3:
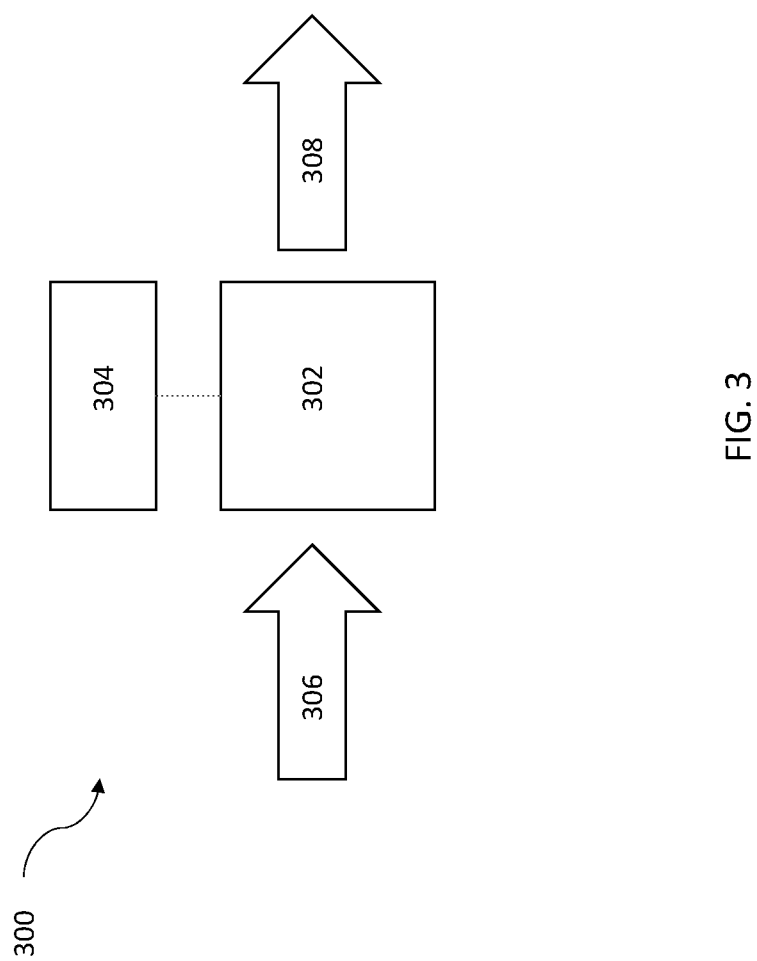
FIG. 3 is a schematic illustration of a direct air capture system that may perform the method illustrated in FIG. 2, according to an embodiment.

FIG. 3 is a schematic illustration of a direct air capture system that may perform the method illustrated in FIG. 2, according to an embodiment. Accordingly, also disclosed herein is a DAC system 300 having a low-density carbon fiber, which may include an EAP 302 according to any of the systems and methods described above. In some embodiments, the DAC system 300 using coal-derived EAP 302 may not include low-density carbon fibers and may additionally or alternatively include other coal derived materials, such as coal-derived graphene or graphene oxide. The DAC system 300 includes a voltage source 304. In an example, the voltage source 304 can include a generator, battery, or cell. In some embodiments the voltage source 304 can include a direct voltage source or an alternating voltage source. The voltage source 304 can include a voltage controlled voltage source or a current controlled voltage source. The DAC system 300 is configured to bind carbon dioxide from a gaseous stream 306. The carbon dioxide binds to the coal-derived EAP 302 when a voltage is applied to the coal derived EAP 302. The carbon dioxide is released once the EAP binding sites are saturated with bound or adsorbed carbon dioxide. The polarity of the voltage can be reversed and the bound carbon dioxide can be emitted from the EAP 302 and/or the DAC system 300. As described above, the polarity can be reversed in a battery and as such, separate materials are not needed for the anode and the cathode in the system 300. The DAC system 300 is configured to produce a gas stream 308 having a lower concentration of $CO_2$ than the gaseous stream 306. In some embodiments, the gas stream 308 includes no $CO_2$.

In an embodiments the coal-derived EAP 302 includes a low thermal conductivity carbon fiber. In some embodiments, the coal-derived EAP can include at least one of a graphene, graphene oxide, graphene nanotubes, carbon nanotubes, or graphene dots. The DAC system 300 can include graphene nanotubes that are configured to provide an additional void space and promote greater insulating properties.

The thermoelectric DAC system or DAC system using coal-derived EAPs may be used in a variety of settings. For example, the thermoelectric DAC system or DAC system using coal-derived EAPs may be used to counter the negative effects of carbon dioxide during a new building or structure construction. Panel-like structures including the thermoelectric DAC system or DAC system using coal-derived EAPs may be added to the buildings to capture carbon dioxide during and after construction of the buildings. The buildings, then, may harvest carbon dioxide in the thermoelectric DAC system or DAC system using coal-derived EAPs. The carbon dioxide captured in the thermoelectric DAC system or DAC system using coal-derived EAPs built into the building may be utilized in numerous materials, such as conversion into hydrocarbon material(s) or a reverse water gas shift that converts the carbon dioxide into syngas and densified liquid(s).

Figure 4:
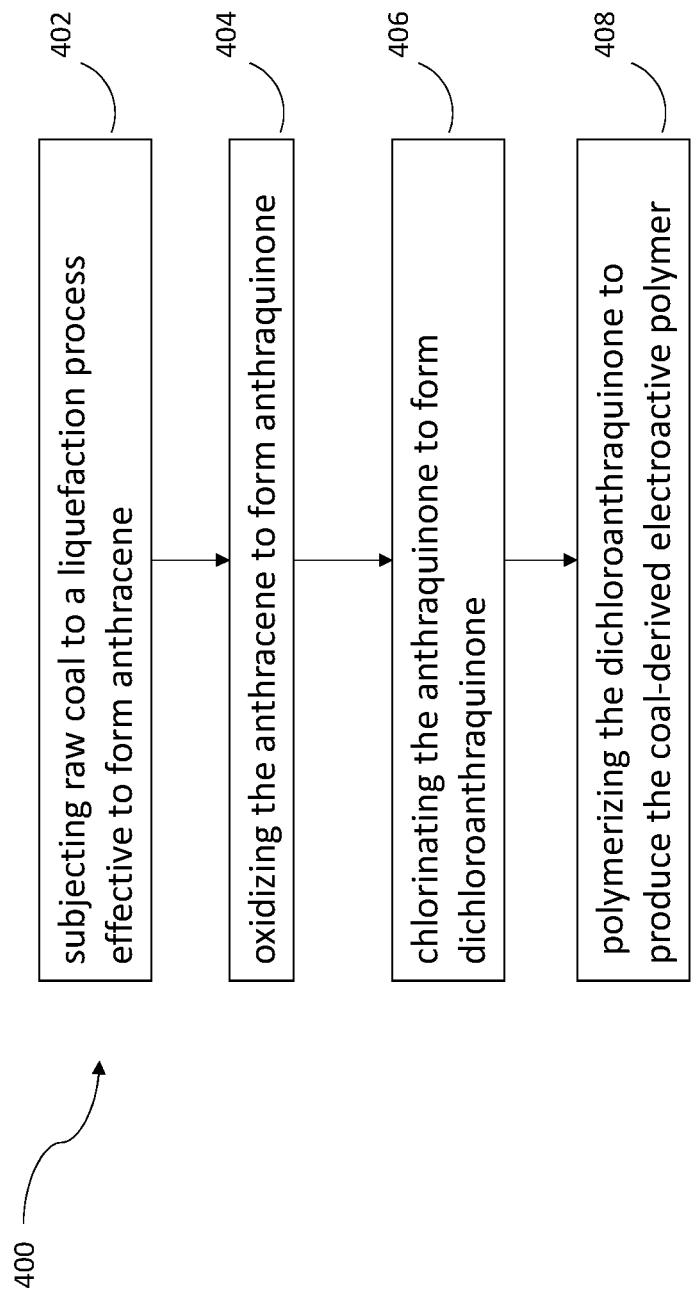
FIG. 4 is a flow chart of a method to derive an electroactive polymer from coal, according to an embodiment.

FIG. 4 is a flow chart of a method 400 to derive an electroactive polymer (EAP) from coal, according to an embodiment. The coal-derived EAPs may be formed from anthracene. In some embodiments, the method 400 can include an act 402 wherein coal can undergo liquefaction effective to produce anthracene and/or other polycyclic aromatic hydrocarbons (PAH). The method 400 can further include act 404 where the coal-derived anthracene may then be oxidized effective to form anthraquinone or a similar product. In an act 406 of method 400, the anthraquinone may then be chlorinated using, for example, hydrochloric acid effective to form dichloroanthraquinone. In an act 408 of method 400, the dichloroanthraquinone can then be polymerized effective to form an EAP.

Figure 5:
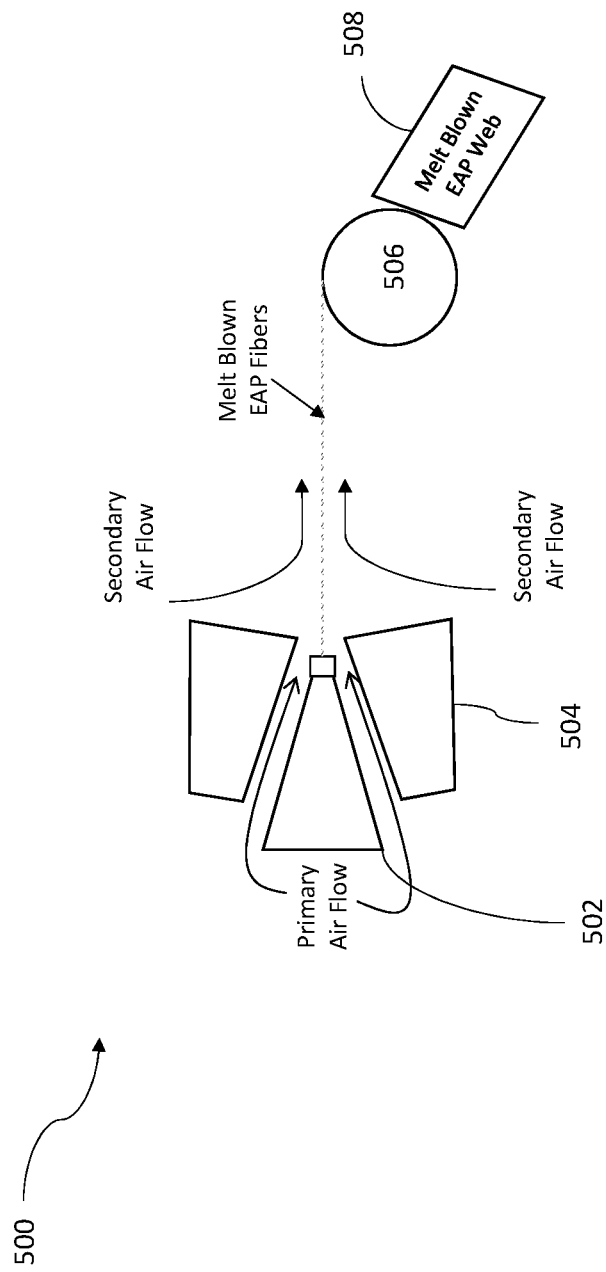
FIG. 5 is a schematic illustration of a solvated melt blown process, according to an embodiment.

In some embodiments, the coal-derived EAPs may be derived from a solvated melt blown process. FIG. 5 is an illustration of a solvated melt blown process 500, according to an embodiment. The melt blown process produces a carbon fiber web of small diameter fibers which increases the surface area of active material to sequester carbon dioxide molecules. The solvated carbon material can be formed into fibers by feeding it through a die head 502 and a die 504 accompanied by a high velocity primary air flow, which flows proximate to the die head 502. Once the fibers enter a formation chamber, they are severed (e.g. by an air knife) and are subject to the cooling air flow, or secondary air flow, which solidifies the carbon material. The carbon fibers and carbon fiber fragments can then accumulate on a collection roller 506 and can form a continuous web of material 508.

As used herein, the term "about" or "substantially" refers to an allowable variance of the term modified by "about" or "substantially" by ±10% or ±5%. Further, the terms "less than," "or less," "greater than," "more than," or "or more" include, as an endpoint, the value that is modified by the terms "less than," "or less," "greater than," "more than," or "or more."

While various aspects and embodiments have been disclosed herein, other aspects and embodiments are contemplated. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

Features from any of the disclosed embodiments may be used in combination with one another, without limitation. In addition, other features and advantages of the present disclosure will become apparent to those of ordinary skill in the art through consideration of the following detailed description and the accompanying drawings. Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including" and "having" come as used in the specification and claims shall have the same meaning as the term "comprising."

Terms of degree (e.g., "about," "substantially," "generally," etc.) indicate structurally or functionally insignificant variations. In an example, when the term of degree is included with a term indicating quantity, the term of degree is interpreted to mean±10%, ±5%, or +2% of the term indicating quantity. In an example, when the term of degree is used to modify a shape, the term of degree indicates that the shape being modified by the term of degree has the appearance of the disclosed shape. For instance, the term of degree may be used to indicate that the shape may have rounded corners instead of sharp corners, curved edges instead of straight edges, one or more protrusions extending therefrom, is oblong, is the same as the disclosed shape, etc.

What is claimed is:

1. A method of processing coal, the method comprising:
   subjecting raw coal to a liquefaction process effective to form a pitch resin;
   forming a blend additive from the raw coal;
   subjecting the pitch resin to a variable crystallinity spinning process effective to form raw fiber while adding the blend additive to the pitch resin, the blend additive comprising an anisotropic pitch with a degree of anisotropy between 0% and 80%;
   subjecting the raw fiber to an oxygen stabilization process at a temperature of between about 200° C. and about 300° C.; and
   subjecting the stabilized fiber to a carbonization process effective to form a carbon fiber.

2. The method of claim 1, further comprising adding an additional blend additive to the pitch resin before or during the variable crystallinity spinning process.

3. The method of claim 2, wherein the additional blend additive includes one or more of an isotropic pitch, an anistroptric pitch of varying degrees, or a thermoplastic blend additive.

4. The method of claim 3, wherein the thermoplastic blend additive includes at least one of phenolic resins or lignin.

5. The method of claim 1, wherein the variable crystallinity spinning process includes a melt blown solvated-spinning system.

6. The method of claim 1, further comprising foaming the raw fiber effective to introduce voids in the carbon fiber.

7. The method of claim 1, further comprising adding an oxygen-containing additive to the pitch resin before or during the variable crystallinity spinning process.

8. The method of claim 7, wherein the oxygen-containing additive includes an oxygen containing polymeric material.

9. The method of claim 1, further comprising adding one or more compounds comprising heteroatoms to the pitch resin before or during the variable crystallinity spinning process.

10. The method of claim 9, wherein the one or more compounds comprising heteroatoms includes oxygen or nitrogen.

11. The method of claim 1, further comprising processing the low thermal conductivity carbon fiber to produce a carbon fiber insulation.

12. The method of claim 1, wherein subjecting the raw fiber to an oxygen stabilization process includes maintaining the fiber under tension.

* * * * *